UNITED STATES PATENT OFFICE.

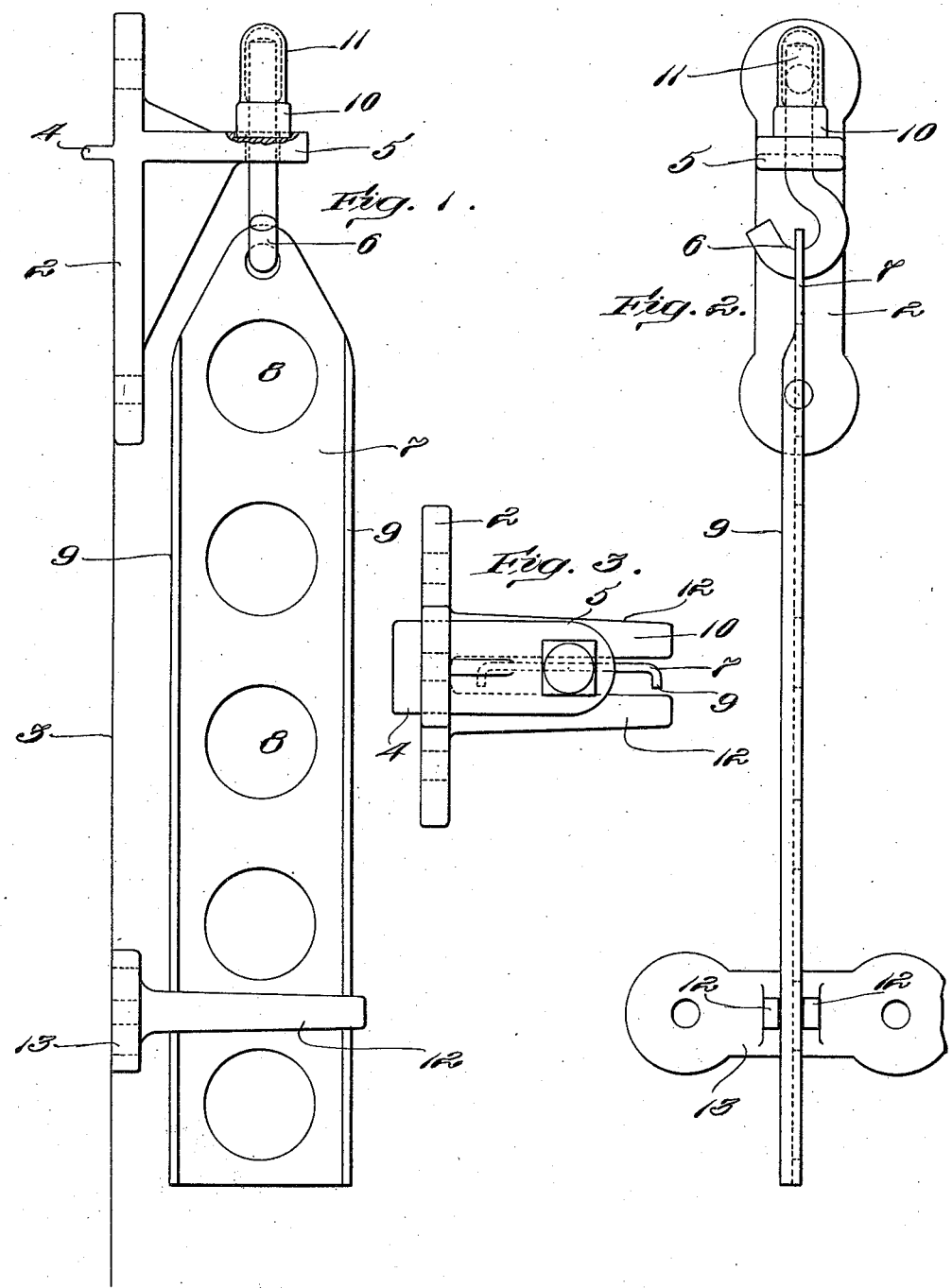

JOHN PUTNAM SWAN, OF PROVIDENCE, RHODE ISLAND, ASSIGNOR TO GENERAL FIRE EXTINGUISHER COMPANY, OF PROVIDENCE, RHODE ISLAND, A CORPORATION OF NEW YORK.

PIPE-HANGER.

1,062,372.

Specification of Letters Patent. Patented May 20, 1913.

Application filed August 30, 1911. Serial No. 646,792.

*To all whom it may concern:*

Be it known that I, JOHN P. SWAN, a citizen of the United States, residing at Providence, in the county of Providence and State of Rhode Island, have invented new and useful Improvements in Pipe-Hangers, of which the following is a specification.

This invention relates to hangers for supporting pipes in a horizontal or substantially horizontal position from the wall of a room or building, and is particularly intended to provide a wall hanger for hot water pipes which will permit such vertical adjustments thereof and such small variations in the distance of the pipes from the supporting wall as may be necessary or desirable for preserving the alinement of the pipes.

In the accompanying drawings: Figure 1 is a side elevation of the pipe hanger, as preferably constructed; and Figs. 2 and 3 are a front elevation and a plan view of the same, respectively.

The hanger illustrated in the drawings comprises a supporting bracket 2 which is adapted to be bolted to the face 3 of a vertical wall and preferably has a rearwardly-projecting lug or rib 4 adapted to enter between two adjacent bricks after the mortar has been chipped out and thus diminish the strain put upon the attaching bolts by the weight of the suspended parts, in case the hanger is applied to a brick wall. This lug may also be inserted in a suitable recess formed in a wooden wall, if desired, although it is not an essential part of the hanger. The bracket 2 has an outwardly-extending arm 5 which is perforated near its end to receive the shank of a suspending hook 6, and on this hook is hung a plate 7 having any desired number of perforations 8 formed therein for receiving the pipe or pipes to be supported. This plate 7, which is preferably made of sheet metal with flanged edges 9 to increase its strength, is adjustable vertically by means of a nut 10 on the screw threaded shank of the hook 6, which nut may be prevented from turning accidentally by some suitable locking arrangement represented in the present instance by a square recess formed in the top of the arm 5 as shown in Fig. 1 and adapted to receive the square lower end of the nut, the latter being normally held in said recess by the weight of the suspended parts. The nut 10 is preferably capped, that is, it has a hollow top portion 11 which is closed at its upper end so as to protect the engaging threads from contact with water and thus prevent corrosion or injury. It is desirable in some cases to provide a guide for the plate 7 which will permit it to swing toward and away from the wall 3 but will prevent it from moving in the direction of the length of the pipes supported thereby, and this is accomplished by locating said plate, at some suitable point below the bracket 2 and preferably near the lower end of the plate, between two outwardly-extending arms 12 carried by another bracket 13 secured to the wall 3. This guide is not essential in all cases, however. As thus constructed, the pipes to be carried by the hanger are inserted in the appropriate perforations in the plate 7 and may then be adjusted vertically as desired by manipulation of the nut 10, while adjustments of the pipes toward and away from the wall 3 are automatically provided for by the capacity of the plate 7 to swing between the arms 12. A simple and inexpensive pipe hanger is thus provided which is strong, durable and easily adjusted, and it will be understood that the details of the same may be variously modified without departing from my invention.

I claim as my invention:

1. A pipe hanger comprising a supporting bracket, a pipe-supporting device pivotally suspended therefrom and means for adjusting the same vertically, and guides to permit swinging movements of the pipe-supporting device transversely to the length of the pipes.

2. A pipe hanger comprising a bracket adapted to be attached to a vertical wall and having an outwardly-extending arm, a hook passing through said arm and having a threaded shank with an adjusting nut thereon, and a plate provided with a series of pipe-receiving perforations and pivotally suspended on said hook in position to swing toward and away from the wall transversely to the length of the pipe carried thereby.

3. A pipe hanger comprising a supporting bracket having an outwardly-extending arm, a perforated plate suspended from said bracket, and a pair of fixed guides extending transversely to the length of the pipes and having the lower portion of said plate located between them.

4. A pipe hanger comprising a bracket adapted to be attached to a vertical wall and having an outwardly-extending arm, a hook passing through said arm and having a threaded shank with an adjusting nut thereon, a pipe-supporting device pivotally suspended from said hook, and fixed guides located below said bracket and arranged to permit swinging movements of the pipe-supporting device toward and from the wall and to prevent movement of said pipe-supporting device in the direction of the length of the pipes.

5. A pipe hanger comprising a bracket adapted to be attached to a vertical wall and having an outwardly-extending arm, a hook having a threaded shank passing vertically through said arm and provided above the latter with an adjusting nut, a plate pivotally suspended on said hook and having one or more pipe-receiving perforations therein, and a supplementary bracket adapted to be attached to the wall and having a pair of outwardly-extending guiding arms between which the lower portion of said plate is located.

In testimony whereof, I have hereunto subscribed my name this 19th day of August, 1911.

JOHN PUTNAM SWAN.

Witnesses:
ALBERT JOHN LOEPSINGER,
JOSEPH FRANCES CONLEY.

---

Copies of this patent may be obtained for five cents each, by addressing the "Commissioner of Patents, Washington, D. C."